(12) United States Patent
Gu et al.

(10) Patent No.: US 12,170,723 B2
(45) Date of Patent: Dec. 17, 2024

(54) METHODS FOR SPLITTING AND RECOVERING KEY, PROGRAM PRODUCT, STORAGE MEDIUM, AND SYSTEM

(71) Applicant: Shanghai NanoJClean Technology Co., Ltd., Shanghai (CN)

(72) Inventors: Jianliang Gu, Shanghai (CN); Bangya Ma, Shanghai (CN)

(73) Assignee: Shanghai NanoJClean Technology, Co., Ltd., Shanghai (CN)

( * ) Notice: Subject to any disclaimer, the term of this patent is extended or adjusted under 35 U.S.C. 154(b) by 306 days.

(21) Appl. No.: 17/593,075

(22) PCT Filed: Mar. 11, 2020

(86) PCT No.: PCT/CN2020/078801
§ 371 (c)(1),
(2) Date: Sep. 8, 2021

(87) PCT Pub. No.: WO2020/182151
PCT Pub. Date: Sep. 17, 2020

(65) Prior Publication Data
US 2022/0191012 A1   Jun. 16, 2022

(30) Foreign Application Priority Data
Mar. 11, 2019   (CN) .......................... 201910179156.3

(51) Int. Cl.
*H04L 9/08*   (2006.01)
*H04L 9/32*   (2006.01)

(52) U.S. Cl.
CPC ............ *H04L 9/0825* (2013.01); *H04L 9/085* (2013.01); *H04L 9/0869* (2013.01); *H04L 9/3247* (2013.01); *H04L 2209/56* (2013.01)

(58) Field of Classification Search
CPC ..... H04L 9/0825; H04L 9/085; H04L 9/0869; H04L 9/3247; H04L 2209/56;
(Continued)

(56) References Cited

U.S. PATENT DOCUMENTS 10,699,031 B2 *   6/2020   Chen ....................... H04L 9/083
10,778,439 B2 *   9/2020   Cheng .................. H04L 9/0643
(Continued)

FOREIGN PATENT DOCUMENTS

CN   105243306 A   1/2016
CN   105429752 A   3/2016
(Continued)

OTHER PUBLICATIONS

Open Topic With Navigation, E-Concepts, PED Authentication, M of N, About. https://cloudhsm-safenet-docs.s3.amazonaws.com/007-011136-002_lunasa_5-1_webhelp_rev-a/Content/concepts/mofn_about.htm (Last viewed on Aug. 23, 2021).
(Continued)

*Primary Examiner* — Mohammed Waliullah
(74) *Attorney, Agent, or Firm* — Downs Rachlin Martin PLLC (57) ABSTRACT

Methods for splitting and recovering a key, a storage medium, a computer program product, and a key management system (170), wherein the key management system
(Continued)

(170) comprises a management device (110) used for managing user equipment of users in a user group and a hardware security module (160) connected to the management device (110). The method for splitting a key comprises: at the hardware security module (160): obtaining the number of the users in the user group and a first predetermined value (202); randomly generating a transaction key associated with the processing authority of the current transaction on the basis of messages of other users except the splitting user in the user group (204); splitting the transaction key into a plurality of sub-keys the same as the users in number, wherein each sub-key in the plurality of sub-keys corresponds to one user in the user group (206); and encrypting the plurality of sub-keys by using public keys of the users corresponding to the plurality of sub-keys, respectively (208).

20 Claims, 7 Drawing Sheets

(58) Field of Classification Search
CPC ......... H04L 9/083; H04L 9/0877; H04L 9/50; G06F 21/72; G06F 21/602; G06F 21/64; G06Q 20/065; G06Q 20/3825; G06Q 20/3829; G06Q 20/3827; G06Q 20/40145
See application file for complete search history.

(56) References Cited

U.S. PATENT DOCUMENTS

| | | | |
|---|---|---|---|
| 2008/0229396 A1* | 9/2008 | Bodepudi | H04L 63/08 726/4 |
| 2013/0013931 A1* | 1/2013 | O'Hare | H04L 9/3231 713/189 |
| 2017/0250972 A1* | 8/2017 | Ronda | H04L 9/0891 |
| 2018/0268386 A1 | 9/2018 | Wack et al. | |
| 2022/0038263 A1* | 2/2022 | Zhang | H04L 9/0825 |

FOREIGN PATENT DOCUMENTS

| | | | |
|---|---|---|---|
| CN | 106548345 | A | 3/2017 |
| CN | 108833093 | A | 11/2018 |
| CN | 109194465 | A | 1/2019 |
| CN | 109389498 | A | 2/2019 |
| JP | 6571890 | B1 * | 9/2019 |
| WO | 2019021105 | A1 | 1/2019 |
| WO | 2019046317 | A1 | 3/2019 |

OTHER PUBLICATIONS

AWS CloudHSM, Managing Quorum Authentication (M of N Access Control) https://docs.aws.amazon.com/cloudhsm/latest/userguide/quorum-authentication.html (Last viewed on Aug. 23, 2021).

* cited by examiner

METHODS FOR SPLITTING AND RECOVERING KEY, PROGRAM PRODUCT, STORAGE MEDIUM, AND SYSTEM

TECHNICAL FIELD

This disclosure relates to a method and product for managing a key, and more specifically, to a method for splitting and recovering a key, a computer program product, a storage medium and a key management system.

BACKGROUND

A public key and a private key are from an asymmetric encryption algorithm of cryptography and are basis of the blockchain technology. Public key is public, and private key needs to be securely kept. The private key is generated based on a random number, and the public key is derived by algorithm from the private key.

There are two main usage scenarios for public keys and private keys: one is public key encryption and private key decryption; and the other is private key signature and public key verification. For the public key encryption and private key decryption, original data is encrypted with the public key, and the original data can be decrypted only with the corresponding private key. In this way, the original data can be transmitted on the network without being stolen and privacy can be protected. For the private key signature and public key verification, original data is signed with a private key, and it is can only be verified with the corresponding public key whether the signature string matches the original data. A private key is equivalent to a password in a centralized accounting system and is a voucher for ownership of an asset.

In many scenarios such as e-commerce, asset division, and fund management, multiple users are required to have control and management authorities over to-be-processed transactions. In conventional authority management schemes, for purpose of improving security and preventing keys from being leaked by individual users with authorities, a multi-signature scheme is usually used. In the field of blockchain technologies, multi-signature can be understood as signing a transaction in turn by multiple users with authorities using their respective private keys respectively.

In the above conventional authority management scheme, multiple users with authorities are required to sign or authorize the same transaction in turn, thus making the entire transaction process more tedious. In addition, each user with authorities holds her or his own key, and when any user loses his or her key or refuses to use the key for any reason, it may delay or prevent the transaction. Furthermore, because the key held by a user with an authority is usually unchanged for a period of time, there is a high probability that the key might be cracked. Moreover, because the management of the key is performed locally, the security is not high.

In view of this, it is necessary to construct a scheme for managing a key, which makes key control and management involving multiple users with authorities more secure and easy to use.

SUMMARY OF THE INVENTION

This disclosure provides a method and device for managing a key, so as to make control and management of keys more secure, reliable and convenient to use.

According to a first aspect of this disclosure, a method for splitting a transaction key in a key management system is provided, where the key management system includes a management device for managing user devices of users in a user group and a hardware security module connected to the management device; and the method includes: at the hardware security module, acquiring a number of the users in the user group and a first predetermined value, where the first predetermined value indicates a minimum number of users for recovering the transaction key, and the user is configured to manage the transaction key; randomly generating the transaction key associated with the processing authority of this transaction based on messages about other users than a splitting user determined to split the transaction key in the user group, where the messages about other users at least indicate public keys of the other users; splitting the transaction key into a plurality of sub-keys of the same number as the number of the users, where each sub-key in the plurality of sub-keys corresponds to one user in the user group; and respectively encrypting the plurality of sub-keys with the public keys of the users corresponding to the plurality of sub-keys.

According to a second aspect of this disclosure, a method for recovering a transaction key in a key management system is provided, where the key management system includes a management device for managing user devices of users in a user group and a hardware security module connected to the management device, where the method includes: at the hardware security module: acquiring a recovery message for recovering the transaction key, where the recovery message includes the number of verified users in the user group who agreed on the transaction and an identifier of a user in the user group that is determined to be a recovery user for recovering the transaction key, where the user group is configured to manage the transaction key; recovering the transaction key based on the sub-keys of the verified user in response to verification that the number of verified users is greater than or equal to a first predetermined value, where the sub-keys of the verified users were generated by splitting the transaction key in advance; and signing a transaction request regarding this transaction based on the recovered transaction key.

According to a third aspect of this disclosure, a computer program product is also provided, where the computer program product is tangibly stored on a non-transitory computer-readable storage medium and includes machine-executable instructions, and the machine-executable instructions are configured to, when executed, cause a machine to execute steps of the method of the first or second aspect.

According to a fourth aspect of this disclosure, a computer-readable storage medium storing machine-executable instructions is also provided, where the machine-executable instructions are configured to, when executed, cause a machine to execute steps of the method of the first or second aspect.

According to a fifth aspect of this disclosure, a key management system is also provided, including a processor, a memory, and computer programs stored in the memory, where the computer programs are configured to, when executed by the processor, make the key management system execute steps of the method of the first or second aspect.

The summary of the invention is provided to introduce the selection of concepts in simplified forms, which will be further described in the detailed description below. The summary of the invention is not intended to identify key features or main features of the disclosure, and is not intended to limit the scope of this disclosure.

BRIEF DESCRIPTION OF THE DRAWINGS

The above and other objectives, features, and advantages of this disclosure will become more apparent by describing the exemplary embodiments of this disclosure in more detail in combination with the accompanying drawings. In the exemplary embodiments of this disclosure, the same reference numerals generally represent the same components.

BRIEF DESCRIPTION OF EMBODIMENTS

Preferred embodiments of this disclosure will be described in more detail below with reference to the accompanying drawings. Although preferred embodiments of this disclosure are shown in the drawings, it should be understood that this disclosure can be implemented in various forms and should not be limited by the embodiments set forth herein. Instead, these embodiments are provided so that this disclosure will be thorough and complete, and will fully convey the scope of this disclosure to those skilled in the art.

The term "including" and variations thereof used in this text mean open-ended inclusion, that is, "including but not limited to." Unless specifically stated, otherwise, the term "or" means "and/or". The term "based on" means "at least partially based on". The terms "one exemplary embodiment" and "one embodiment" mean "at least one exemplary embodiment." The term "another embodiment" means "at least another embodiment". The terms "first", "second", etc. may refer to different or identical objects. Other explicit and implicit definitions may be included below. The technical schemes or technical features in different embodiments can be combined with each other without contradiction.

The order in which the method steps are described herein does not necessarily mean that the methods must be executed in the order in which they are presented. The order of steps has a limiting effect only if a person of ordinary skill in the art (for example, a programmer) directly and clearly believes that the technical steps should be performed in a specific order after reading this article. In modem computer systems, method steps may be executed in parallel or in an order different from that in the text according to needs.

As described above, in conventional authority management schemes, because keys held by users are unchanged for a long time, and transaction keys are always randomly generated by a same local user, there is a risk that transactions might be easily cracked or leaked. Therefore, a signing process of the conventional authority management scheme is performed locally, which is not safe and convenient, and the reliability of the system is low, which is easily subject to some improper actions involving the use of authorities.

In order to at least partially solve one or more of the above problems and other potential problems, example embodiments of this disclosure provide a scheme for managing a key.

In an aspect of the scheme, a method for splitting a transaction key in a key management system is provided. The key management system includes a management device for managing user devices of users in a user group and a hardware security module connected to the management device. The method includes: at the hardware security module, acquiring the number of the users in the user group and a first predetermined value, where the first predetermined value indicates a minimum number of users for recovering the transaction key, and the user group being configured to manage the transaction key; randomly generating the transaction key associated with the processing authority of this transaction based on messages about other users than a splitting user determined to split the transaction key in the user group, where the messages about other users at least indicate public keys of the other users; splitting the transaction key into a plurality of sub-keys of the same number as the number of the users, where each sub-key in the plurality of sub-keys corresponds to one user in the user group; and respectively encrypting the plurality of sub-keys with the public keys of the users corresponding to the plurality of sub-keys. In another aspect of the scheme, a method for recovering a transaction key in a key management system is provided. The method includes: at the hardware security module: acquiring a recovery message for recovering the transaction key, where the recovery message includes the number of verified users in the user group who agreed on the transaction and an identifier of a user in the user group that is determined to be a recovery user for recovering the transaction key, where the user group is configured to manage the transaction key; in response to verification that the number of verified users is greater than or equal to a first predetermined value, recovering the transaction key based on the sub-keys of the verified users, where the sub-keys of the verified users were generated by splitting the transaction key in advance; and signing a transaction request regarding this transaction based on the recovered transaction key.

Herein, a transaction refers to "a blockchain transaction", that is, a transaction initiated by a node in the blockchain network and recorded in the distributed ledger of the entire blockchain network based on the consensus mechanism of the entire blockchain network.

In the above scheme, a transaction key is randomly generated in a specific hardware security module and the transaction key is split into a plurality of sub-keys of the same number as the number of the users in a user group, and each sub-key is encrypted with a public key of a user corresponding to the sub-key. The scheme provided by the exemplary embodiment of this disclosure reduces the risk of being easily cracked or leaked due to the transaction key being unchanged or the transaction key always being generated randomly by the same user. Moreover, since a single user with a sub-key cannot independently recover the transaction key, multiple users need to work together to recover the transaction key. Therefore, the risk caused by the recovery and use of the transaction key by the same user is reduced, and the security of the transaction key is further improved. In addition, a minimum number of users is set for recovering the transaction key, so that when an individual user has a problem (such as losing a sub-key or refusing to use the sub-key), the transaction key can still be recovered and used through the cooperation of other users, thereby improving the reliability and robustness of the authority management system. In addition, multiple encrypted sub-keys are sent to the management device, and the management device can cache the encrypted sub-keys without requiring other users in the user group to synchronize operations. As a result, asynchronous processing of transaction key splitting and distribution among multiple users can be realized, which improves the convenience of the authority management system. In addition, the key splitting and recovery are performed non-locally, which can further ensure the security of the key system.

Figure 1:
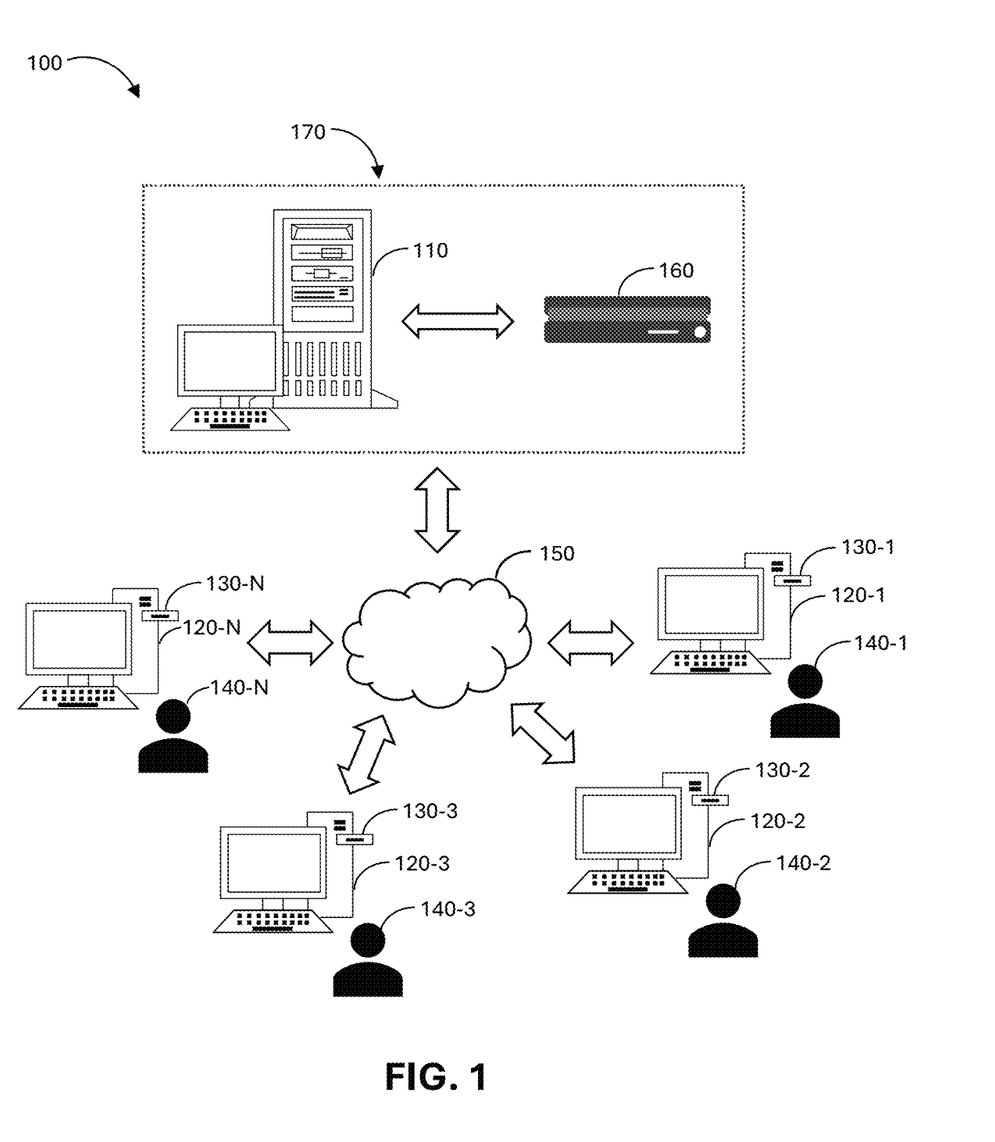
FIG. 1 is an architecture diagram of a system 100 for managing a key according to an embodiment of this disclosure.

FIG. 1 is an architecture diagram of a system 100 for managing a key according to an embodiment of this disclosure. As shown in FIG. 1, the system 100 includes a management device 110, a Hardware Security Module (HSM) 160, a plurality of user devices 120-1, 120-2, 120-3, 120-4 to 120-N (sometimes collectively referred to as a user device 120). The plurality of user devices, for example, are associated with a plurality of users 140-1, 140-2, 140-3, 140-4 to 140-N (sometimes collectively referred to as a user 140). The users 140-1 to 140-N have common authority on matters such as transactions or asset disposal, so they can form a user group managing transaction keys. The management device 110 and the plurality of user devices 120-1, 120-2, 120-3, 120-4 to 120-N perform data interaction over a network 150. Regarding the management device 110, it can be, but not limited to, a personal computer, a server or other computing devices. The network 150 may be a wired network or various wireless networks.

The hardware security module 160 may be an internationally recognized hardware security module that meets predetermined security certification standards, such as the Common Criteria for Information Technology Security Evaluation, the US Federal Information Processing Standard (FIPS) 140-2 or other international certifications, and includes a memory (not shown in the figure) and a processor (not shown in the figure). The hardware security module 160 according to the present invention is further customized and developed to be able to generate, according to various cryptographic algorithms, a key to be used as a transaction key, and to split and recover the transaction key. These cryptographic algorithms can use algorithms well known in the art, and are not described in detail herein.

The management device 110 and the hardware security module 160 are located in a same security network domain, and only authorized users can access the hardware security module 160 via the management device 110. The user device 120 or other components can access the hardware security module 160 via the management device 110, that is, the management device 110 may be regarded as a gateway for accessing the hardware security module 160. In other embodiments, the management device 110 and the hardware security module 160 may be physically separated and are connected via a security link; however, the relationship between the management device 110 and the hardware security module 160 is not limited thereto, and it is also possible that the hardware security module 160 is provided inside the management device 110, or the management device 110 and the hardware security module 160 are an integrated hardware but are logically separated. Herein, to facilitate description, a combination of the management device 110 shown in FIG. 1 and the hardware security device 160 associated with the management device 110 is called a key management system 170.

The management device 110 is configured to interact with the user device 120 to implement initialization of the user device 120 of users 140. A group-forming user, a splitting user, or a recovery user in a user group is designated or randomly determined, so as to help the group-forming users to create a user group for managing the transaction key and cache and distribute sub-keys generated by splitting by the hardware security module 160.

In some embodiments, in response to a registering request of the user device, the management device 110 confirms whether the user device passes verification and confirms whether the entire user group passes verification by verifying a user device of each user in the user group passes verification. In some embodiments, the management device 110 may also be configured to acquire, from the group-forming users creating the user group, the number of users in the user group and the minimum number (that is, a first determined value) of users for recovering the transaction key.

The hardware security module 160 is configured to generate the transaction key and help the splitting user to split the transaction key into a plurality of sub-keys of the same number as the number of the users in the user group, and help the recovery user to recover the transaction key. Specifically, the hardware security module 160 may be configured to randomly generate a transaction key, create a polynomial for splitting the transaction key to split the transaction key into a plurality of sub-keys and recover the transaction key based on the plurality of sub-keys in response to a request from the user. The functions of the management device 110 and the hardware security module 160 are not limited to the description herein. For example, in addition to the functions described here, the functions of the hardware security module 160 can also have part or all of the functions of the management device 110, that is, the management device 110 and the hardware security module 160 are integrated together.

"Non-local" as used herein is relative to the user device 120 below. From the perspective of user 140, the user device 120 may be called a local device, while the management device 110 and the hardware security module 160 may be called non-local devices, for example, may be cloud-end or server-end devices. By splitting and recovering the transaction key at the non-local hardware security module 160, rather than at the local user device, it can be ensured that the key is not stolen by unauthorized third parties. A Platform Security Architecture (PSA) framework may be used for the hardware security module. Because the hardware security module (HSM) using the platform security architecture framework is easy to customize and cannot be cracked theoretically, it can further ensure the security of the entire system.

User devices 120-1, 120-2, 120-3, 120-4 to 120-N are, for example, but not limited to conventional mobile phones, tablets, personal computers, and the like. Each user device 120 has a hardware security device 130 (such as 130-1, 130-2, 130-3, 130-4, or 130-N) associated with it. The hardware security device 130 is, for example, not limited to a USB KEY, which can be plugged and played to the user device 120, for example. The hardware security device 130 may create its own public key K and private key P pairs for asymmetric encryption. Herein, the public key K and private key P of the hardware security device 130 are mainly used for identity authentication of the corresponding user device 120. For example, the public key K can be used as the identifier of the hardware security device 130 (or the corresponding user device 120) in the entire system 100, and the private key P is used to sign, so that the management device 110 (or the corresponding hardware security module 160) can use public key K to perform sign verification. In this case, the structure and function of the hardware security device 130 are similar to the existing USB KEY.

In addition, in other embodiments, the hardware security device 130 is a hardware security device configured with a biometric module (not shown in the figure). In this case, the biometric module may be a fingerprint identification module and/or an iris identification module and/or a face identification module. By including a biometric module, when the password is known to a third person due to hacking or leaking by themselves, the identity of the person can be further verified, thereby achieving higher security. In addition, although the fingerprint identification module and/or the iris identification module and/or the face identification module are exemplified as the biometric module, specific examples of the biometric module are not limited thereto, as long as the biometrics can be used for identification. By using the biometric module, the user's identity can be further verified at the local USB KEY device, which further ensures local security.

For convenience of description, a combination of each user device 120 and a hardware security device 130 associated with the user device 120 as shown in FIG. 1 is also referred to as a user device 120, as used herein. In addition, different user devices may also refer to a combination of a hardware security device 130 associated with different users and a general user device 120, respectively.

However, the present invention is not limited thereto. The user device 120 described in the present invention may also be a separately designed and an integration of communication and processing function modules and a general hardware security device 130. Such user device 120 can create its own private key K and a public key P for asymmetric encryption, and also establish mutual trust by mutual authentication with the management device 110 and the hardware security module 160 in order to exchange keys and transaction information. In addition, the user device 120 may also be designated by the management device 110 or randomly determined as a group-forming user, a splitting user, a recovery user, or other user in a user group. In some embodiments, the user device (e.g., 120-1) is randomly determined by the management device 110 as the user device of a group-forming user configured to form a user group. The user device 120-1 may determine business information of the user group (for example, a first predetermined value M including the number N of users and the minimum number of users instructed by the user for recovering the transaction key), and send the business information to the management device 110. In some embodiments, the user device (e.g., 120-2) is designated or randomly determined by the management device 110 as the user device of the splitting user for splitting the transaction key. In some embodiments, the user device (e.g., 120-3) is designated by the management device 110 or randomly determined as the user device of the recovery user to recover the transaction key. The determination of the group-forming user that forms the user group, the splitting user that splits the transaction key, and the recovery user that recovers the transaction key may also be performed by methods other than being designated or randomly determined by the management device 110.

Figure 2:
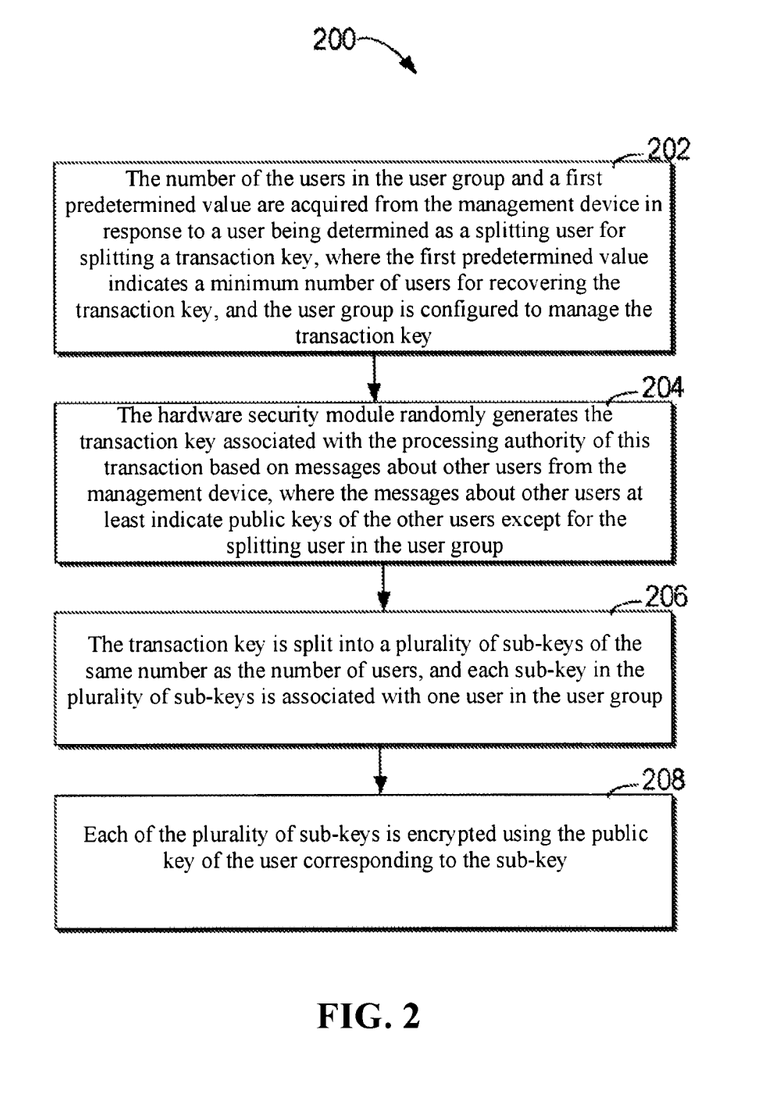
FIG. 2 is a flowchart of a method 200 for splitting a transaction key according to an embodiment of this disclosure.

FIG. 2 is a flowchart of a method 200 for splitting a transaction key according to an embodiment of this disclosure. In FIG. 2, various actions are performed, for example, by a key management system 170 including a management device 110 and a hardware security module 160. The method 200 includes various actions in the phase of splitting the key.

In addition, additional actions not shown and/or actions shown may be omitted, and the scope of this disclosure is not limited in this respect.

At a block 202, in response to a user being determined as a splitting user for splitting a transaction key, the hardware security module 160 acquires the number N of the users in the user group and a first predetermined value from the management device 110, where the first predetermined value indicates a minimum number M of users for recovering the transaction key, and the user group is configured to manage the transaction key. The number N of users in the user group and the first predetermined value may be previously sent to the management device 110 and stored in the management device 110 by the user device 120 of the group-forming user who previously performed group-forming for multiple users. In some embodiments, M is less than the number N of users in the user group. In some embodiments, the group-forming user and the splitting user are designated or randomly determined by the management device 110. In some embodiments, the splitting user used to split the transaction key and the group-forming user used to create the user group can be the same user or different users. In some embodiments, the user device 120 (more specifically, the hardware security device 130 associated with the user device 120) includes a biometric module, which may be a fingerprint identification module and/or an iris identification module and/or a face identification module.

At a block 204, the hardware security module 160 randomly generates a transaction key associated with the processing authority of this transaction based on messages about other users from the management device 110, where the messages about other users at least indicate public keys of the other users than the splitting user in the user group.

In the above scheme, by randomly generating the transaction key associated with the processing authority of this transaction at the hardware security module 160, the risk of being easily cracked due to the transaction key being unchanged or repeatedly used can be reduced. In addition, because only authorized users can access the hardware security module 160 through the management device 110, compared with generating a transaction key in the local user device, this method of generating a transaction key can further ensure security.

In some embodiments, the message associated with other users also indicates at least one of the following: signature information for verifying public keys of the other users; identifiers of the other users; or signature information of a hash value of combined data of the other users and a validity period of the messages about other users. In addition, in some embodiments, the information about other users received by the hardware security module 160 from the management device 110 also includes a certificate of the management device 110. In this case, the hardware security module 160 can further confirm the identity of the management device 110 by verifying the certificate of the management device 110, and execute the operation in block 204 only when the certificate of the management device 110 passes the verification.

Regarding the signature information of a hash value of the combined data of other users, in some embodiments, the management device 110 first calculates the following combined data for each other user hash in the user group: hash values of the numbers of other users in the user group, the hash values of the public keys of the other user, and the signature hash value of the user group password of the other users (and a possible hash value of the certificate of the management device 110); then uses the private key of the management device to sign the hash value of the combined data, so that the hardware security module 160 verifies the data in messages about other users. In the above scheme, by including the hash value of the signed other user's combined data in the message about other users, the hardware security module 160 can easily verify whether the data of the received message about other users has been tampered with.

Regarding randomly generating a transaction key, in some embodiments, it includes: in response to determining that the certificate of the management device 110 passes verification, based on the signature information of the public keys of other users, determining whether the public keys of other users pass verification; and in response to the public keys of the other users passing verification, randomly generating a plurality of random numbers that are the same as the first predetermined value and used to construct a splitting polynomial, where the random number includes the transaction key.

At a block 206, at the hardware security module 160, the transaction key is split into a plurality of sub-keys of the same number as the number of the users, and each sub-key in the plurality of sub-keys is associated with one user in the user group. In some embodiments, splitting the transaction key into a plurality of sub-keys includes determining a plurality of sub-keys based on the number of users in the user group and a plurality of random numbers used to construct the splitting polynomial, where each key includes a first sub-key component and a second sub-key component. There are many ways to split the transaction key. For example, there are many known algorithms to split the key. In some embodiments, the transaction key may be split into a plurality of sub-keys based on the following splitting polynomial (1).

$$Y = A_0 + A_1 * X + A_2 * X^2 + \ldots + A_{N-1} * X^{M-1} \quad (1)$$

In the above splitting polynomial, M represents the minimum number of users for recovering the transaction key. $A_0$, $A_1 \ldots A_{M-1}$ represent random numbers used to construct the splitting polynomial. The above random numbers are random numbers randomly generated by the hardware security module 160 which are of the same number as the minimum number of users M for recovering the transaction key. For example, $A_0$ can represent the transaction key used for this transaction. When $A_0$ to $A_{M-1}$ and M are determined, they can be used to construct a number N of (X, Y) pairs, for example, to determine $X_1$ to $X_N$ of the same number N as the number of the users in the user group. A number N of determined Y values can be obtained based on the splitting polynomial, for example, $Y_1$ to $Y_N$. The number N of (X, Y) pairs determined based on the polynomial, that is: $(X_1, Y_1)$, $(X_2, Y_2) \ldots (X_N, Y_N)$ represent the number N of split sub-keys correspond to the N users of the user group. Based on the splitting polynomial, the number N of users in the user group, the minimum number M of users for recovering the transaction key, and the random numbers $A_0$ to $A_{M-1}$ randomly generated by the hardware security module 160, the hardware security module 160 can split the transaction key $A_0$ into N sub-keys $(X_1, Y_1), (X_2, Y_2), \ldots (X_N, Y_N)$ that are of the same number as the number of users in the user group. Each sub-key (X, Y) includes a first sub-key component X and a second sub-key component Y. In the above scheme, the randomly generated transaction key $A_0$ is divided into a plurality of sub-keys of the same number as the number of the users in the user group by the hardware security module 160, which not only can effectively avoid the risk of being easily cracked due to the unchanged transaction key, but also as described below, a single user with a sub-key cannot independently recover the transaction key, only the minimum number (M) of users can collaborate to recover the transaction key, thus significantly improving the security of the transaction key. In some embodiments, M may be less than the number N of users in the user group. By setting the minimum number M of users for recovering the transaction key, and making M<N, the scheme for managing keys proposed by the exemplary embodiment of this disclosure can still be used to recover the transaction keys through collaboration of M users even when some users have problems, so that the reliability of the authority management system is improved. In addition, in addition to satisfying the number, the condition may also be that one or some specific users must be included in the M users. The conditions here can be set as desired according to actual needs.

At a block 208, at the hardware security module 160, each of the sub-keys is encrypted using the public key of the user corresponding to the sub-key. In some embodiments, encrypting each of the sub-keys with the public key of the user corresponding to the sub-key includes: encrypting the sub-key based on the public key of the user corresponding to the sub-key and a validity period of the messages about other users. In an embodiment, the public key of each user may be stored in the management device 110 or the hardware security module 160. In the above scheme, with the public key of the corresponding user to encrypt the corresponding sub-key, the security of each sub-key is improved. Even if others know the encrypted sub-key, they will not be able to crack the sub-key because they cannot obtain the private key of the corresponding user. Therefore, the security of the transaction key is improved.

In another embodiment, a public key of a user may not be stored in the management device 110 or the hardware security module 160. Instead, it is generated, according to the layered deterministic rules, by the hardware security module 160 based on the identifier of the user and the identifier of the management device 110 (or its owner) every time it is used. In this way, under the premise of ensuring security, the burden of the system managing the public key of each user is eliminated.

In addition, the method 200 may further include that: the hardware security module 160 stores each encrypted sub-key, or sends it to the management device 110 for storage, or sends it to the corresponding user device in the user group via the management device 110 respectively for storage. In the latter two cases, the hardware security module 160 does not store sub-keys generated by splitting.

In some embodiments, the method 200 further includes a management device 110 to help the user device perform initialization. In some embodiments, the management device 110 uses its private key to sign a random number to generate signature data, and sends the generated signature data to the group-forming user for forming a user group. The user device 120 of the group-forming user verifies the signature data, and the signature data is signed based on the private key preset in the user device 120 when verification is passed. In addition, in some embodiments, the management device 110 also receives business information about the user group from the user device 120 of the group-forming user, the public key of the user device 120, and the signature data signed by the private key of the user device 120, where the business information at least includes the number of numbers in the user group and a first predetermined value. In the above scheme, the signature information of the management device 110 is verified by user device 120 of the group-forming user and the signature information signed by the private key of the user device 120 of the group-forming user is verified by management device 110, which can realize mutual trust between the user device 120 of the group-forming user and the management device 110, and improve the security of the entire system 100. In addition, by sending business information including the number N of users of the user group and the first predetermined value M to the management device 110, so as to facilitate the management device 110 to collaborate the hardware security module 160 in the process of splitting and recovering the transaction key.

Figure 3:
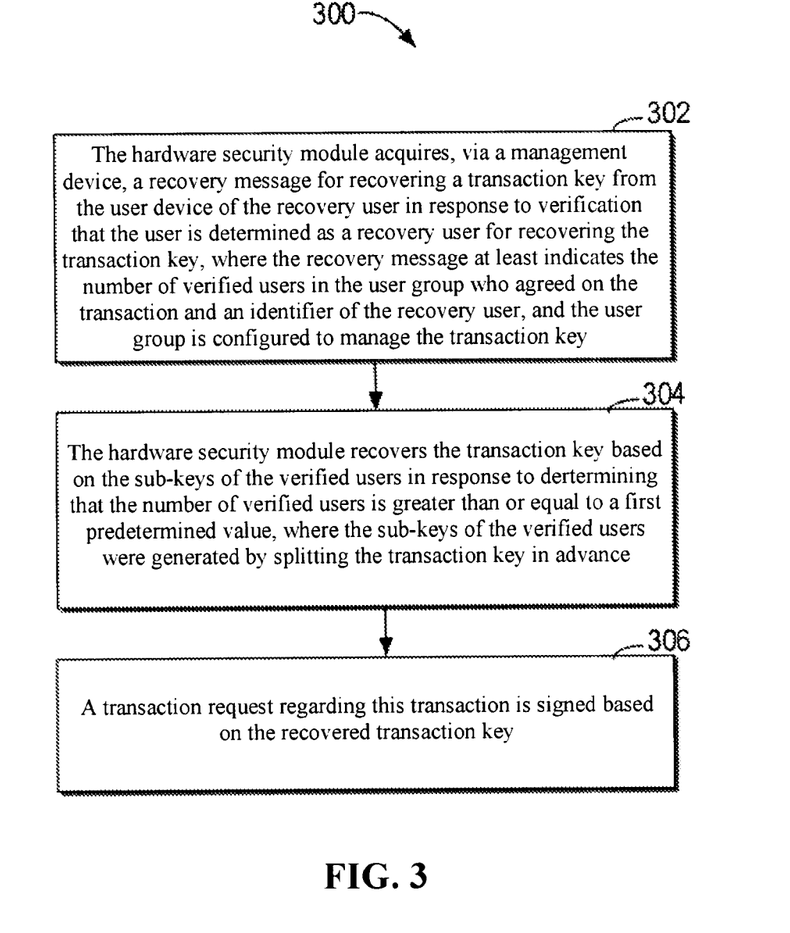
FIG. 3 is a flowchart of a method 300 for recovering a transaction key according to an embodiment of this disclosure.

FIG. 3 is a flowchart of a method 300 for recovering a transaction key according to an embodiment of this disclosure. In FIG. 3, various actions are performed by, for example, a key management system 170 including a management device 110 and a hardware security module 160. The method 300 includes various actions in the phase of recovering the key, and may further include additional actions not shown and/or the actions shown may be omitted, and the scope of this disclosure is not limited in this regard.

At a block 302, the hardware security module 160 acquires, from the management device 110, a recovery message for recovering a transaction key, where the recovery message includes the number of verified users in the user group who agreed on the transaction and an identifier of a user in the user group that is determined to be a recovery user for recovering the transaction key, and the user group is configured to manage the transaction key. In some embodiments, the recovery user is designated or randomly determined by the management device 110 from the user group. In some embodiments, the recovery message also indicates at least one of the following: an association random number associated with this transaction; the sub-keys of the verified user and the association random number that are encrypted with a public key of the recovery user; signature information of the verified user; and signature information of a hash value of the recovery message. In addition, in some embodiments, the recovery message may also include a certificate of the management device 110. In this case, the hardware security module 160 can further confirm the identity of the management device 110 by verifying the certificate of the management device 110, and execute the operation in the block 304 only when the certificate of the management device 110 passes the verification.

At a block 304, the hardware security module 160 recovers the transaction key based on the sub-keys of the verified users in response to determining that the number of verified users is greater than or equal to a first predetermined value, where the sub-keys of the verified users were generated by splitting the transaction key in advance (for example, by using the method like the method 200). In some embodiments, the hardware security module 160 recovers the transaction key based on the sub-keys of the verified users stored therein or the sub-keys of the verified users obtained from the management device 110 and stored in the management device 110. In other embodiments, the hardware security device 160 recovers the transaction key based on the sub-keys sent by each verified user via the management device 110. In this case, the sub-keys of the verified users may be encrypted with the public key of the recovery user. In some embodiments, the sub-keys of the verified users are encrypted together with the association random number associated with the transaction via the public key of the recovery user. In the above scheme, the sub-keys are encrypted together with the association random number associated with this transaction, so that the sub-keys can only be used to recover the transaction key of this transaction, and cannot be reused for the recovery of the transaction keys of other transactions.

In some embodiments, the transaction key may be recovered, without limitation, based on the splitting polynomial (1) mentioned above. Given that the number of random numbers in the splitting polynomial (1) is M, that is, $A_0$ to $A_{M-1}$, in the case of acquiring at least M sub-keys $(X_1, Y_1)$, $(X_2, Y_2)$, ... $(X_M, Y_M)$ of the verified users, the transaction key $A_0$ can be obtained by solving M random numbers $A_0$ to $A_{M-1}$.

At a block 306, a transaction request regarding this transaction is signed based on the recovered transaction key. In some embodiments, the hardware security module 160 sends the signed current transaction request to the user device 120 of the recovery user via the management device 110, so that the user device 120 of the recovery user can release the transaction request to the node (not shown in the figure) of the blockchain to execute this transaction. Alternatively, the hardware security module 160 may also directly release or broadcast the transaction request to the node of the blockchain (not shown) via the management device 110. In the above scheme, by setting the minimum number of users (i.e., the first predetermined value) for recovering the transaction key, and the transaction key is recovered based on the sub-key of the recovery user (or, together with the sub-keys of the verified users) in response to determining that the number of users is greater than or equal to the first predetermined value, so that the transaction key can be restored based on the collaboration of some users in the user group. Therefore, the reliability and robustness of the authority management system are improved, and it can resist some improper actions involving the use of authority.

Figure 4:
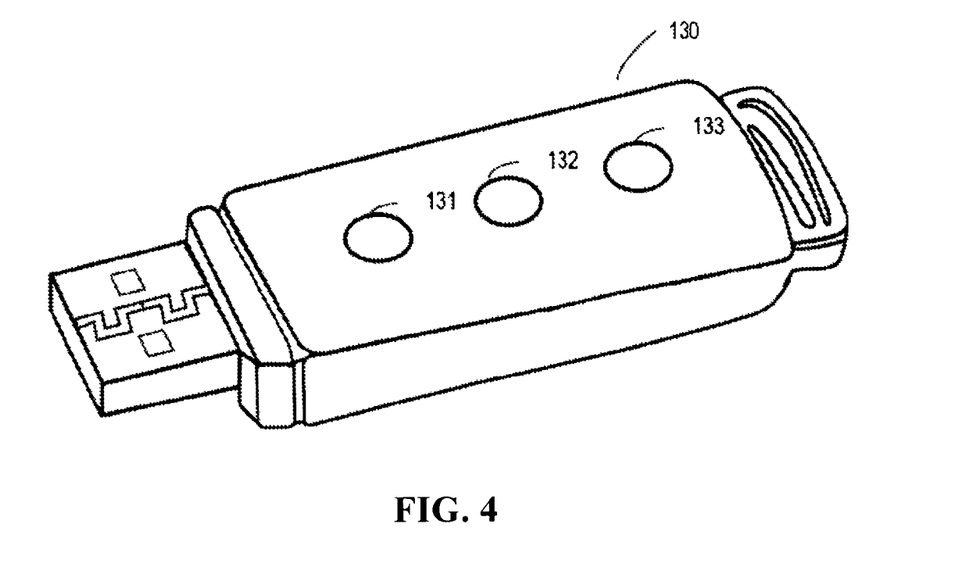
FIG. 4 is a block diagram of a hardware security device 130 according to an embodiment of this disclosure.

FIG. 4 is a block diagram of a hardware security device 130 according to an embodiment of this disclosure.

The hardware security device 130 is a hardware security device configured with a biometric module, and is used to identify the user. The process of identifying the user's identifier is divided into two steps: the first step is to identify the biological characteristics of this user; and the second step is to determine whether this user is an authorized user based on the biological characteristics.

The biometric module may be a fingerprint identification module 131 and/or an iris identification module 132 and/or a face identification module 133. According to its fingerprint identification method, the fingerprint identification module 131 can be divided into: an optical fingerprint module that recognizes a fingerprint by the principle of light refraction and reflection; a capacitive fingerprint module that collects fingerprints by changing the value of a capacitor; and a radio frequency fingerprint module that uses trace radio frequency signals to detect lines. The iris identification module 132 can identify the iris image features of the human eye. The process generally includes: an iris image acquisition step, an image preprocessing step, an iris positioning step (determining the boundary between the iris and the pupil, and the boundary between the iris and the sclera, and the boundary between the iris and the upper and lower eyelids), a feature extraction step, and a feature matching step. The face identification module 133 is also referred to as a human face identification module, a face image identification module, a facial identification module, and the like, and uses a general-purpose camera as an identification information acquisition device to obtain a face image of an identification object in a non-contact manner. The example of the biometric module is not limited to the example here, as long as the biometrics of the user can be identified.

By using the biometric module of the hardware security device 130 of the present invention, it can be further determined whether this operator is an authorized user of the hardware security device 130. For example, after a provider, such as the owner of the management device 110, provides the hardware security device 130 to an authorized user, the authorized user can collect the biometrics of the hardware security device 130 and record them in the hardware security device 130 when the hardware security device 130 is initialized. Thereafter, when the operator operates the user device 120 including the hardware security device 130, the operator is first required to enter biological information (such as fingerprint, iris, face, etc.), and the biometric module identifies the input biometric information to determine the biometric characteristics of the operator, and compares them with the biometric characteristics recorded in the hardware security device 130 to determine whether the operator is an authorized user of the hardware security device 130. The biometric module of the hardware security device 130 can be used independently to identify the identity of the operator, or it can be combined with other methods such as a password to enhance the identity of the operator. For example, the biometric module of the hardware security device 130 may be invoked during the initialization phase of user devices 504, 506, and 508 as shown in FIG. 5, or the biometric module of the hardware security device 130 may be invoked at the phase of splitting the transaction key and/or recovering the transaction key as shown in FIG. 5, or the biometric module of the user device of the recovery user may be invoked when the transaction is signed at the end of the process shown in FIG. 5.

Figure 5A:
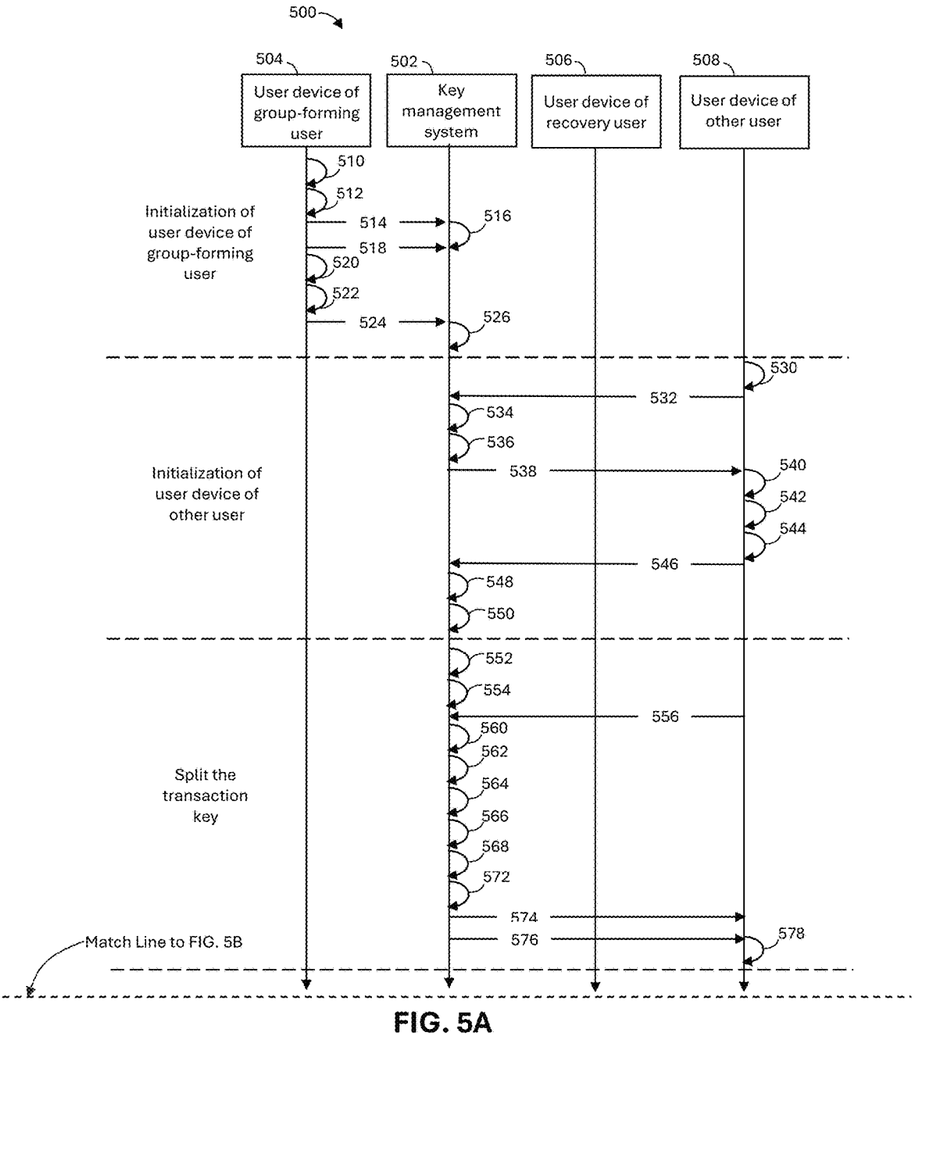
FIGS. 5A and 5B present a data flow diagram of a method 500 for managing a key according to an embodiment of this disclosure.
Figure 5B:
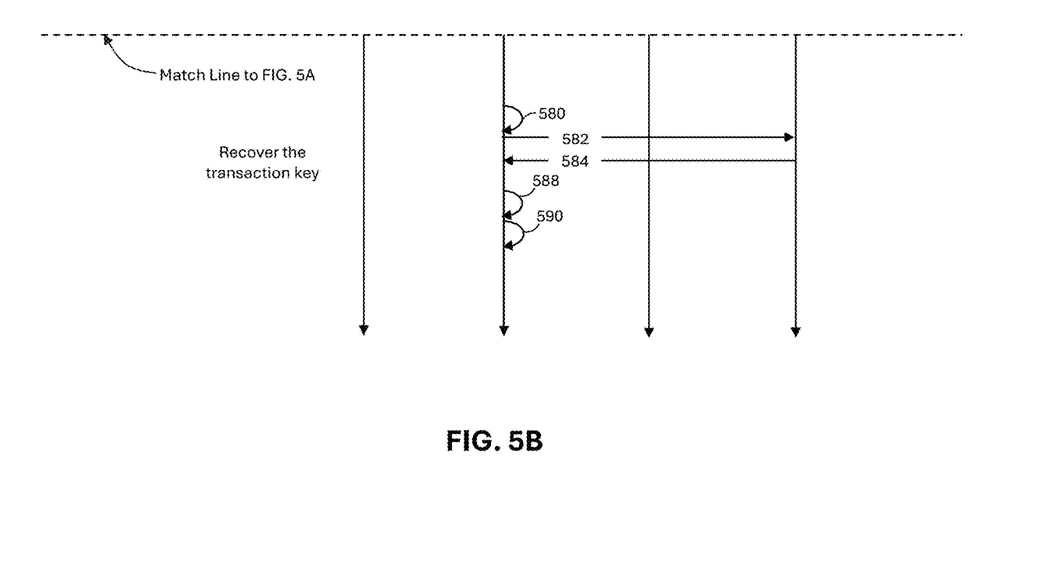

FIG. 5 is a data flow diagram of a method 500 for managing a key according to an embodiment of this disclosure. In FIG. 5, various actions are implemented by, for example, a key management system 502, a user device 504 of the group-forming user, a user device 506 of the recovery user, and user devices 508 of other users. The method 500 mainly includes user group formation (for example, including group-forming user initialization, other user initialization), transaction key splitting, and transaction key recovery phases. It should be understood that the method 500 may further include additional actions not shown and/or the actions shown may be omitted, and the scope of this disclosure is not limited in this regard. Here, the key management system 502 is, for example, the key management system 170 described above in combination with FIG. 1, that is, a combination of the management device 110 and the hardware security device 160. The user devices 504, 506, and 508 may be, for example, the user device 120 described in combination with FIG. 1.

The following example shows the actions of the group-forming phase of the user group. The group-forming phase of the user group mainly includes initialization of a group-forming user and initialization of other users of the user group.

The following example shows the actions of the group-forming user in the initialization phase of the user group.

At a user device 504 of the group-forming user, at 510, a private key K1 and a public key P1 of a group-forming user are created. At 512, a password for the user group is created. At 514, a verification request is sent to the key management system 502. The group-forming user is, for example, a group-forming user designated by the key management system 502 (such as the management device 110) or randomly determined to be used to form a user group.

At the key management system 502, at 516, the private key KO of the management device 110 is used to sign the generated random number R1 for authentication of the group-forming user. At 518, signature data is sent to the user device 504 of the group-forming user, the signature data including, for example, the random number R1, the signed random number R1, and the certificate of the management device 110, where the certificate of the management device 110 includes, for example, the public key PO of the management device 110.

At user device 504 of the group-forming user, at 520, it is determined that the signature data from the key management system 502 passes verification. For example, it is determined whether the received certificate of the management device 110 and the random number signed by the management device 110 pass the verification. At 522, the private key K1 of the user device 504 of the group-forming user is used to sign the random number R1 and the password of the user group in response to determining that the signature data from the key management system 502 passes verification. At 524, the business information about the user group, the public key P1 of the user device 504, and the signature data signed by the private key K1 of the user device 504 are sent to the key management system 502, where the service information includes at least the number N of users of the user group and a first predetermined value M.

At the key management system 502, at 526, based on the obtained public key P1 of the user device 504, the random number R1 signed by the private key K1 of the user device 504 is verified, and the password of the user group is cached.

The following example shows the actions of other users of the user group during the initialization phase.

In some embodiments, the user device 504 of the group-forming user may share the established link of the user group and the password of the user group to other users of the user group in various ways. For example, the user device 504 of group-forming user shares the link of the user group and the password of the user group to other users in the user group through a local area network. For example, the user device 508 of other users is the user device of any user in the user group except for the group-forming user.

At the user device 508 of the other user, at 530, the private key K2 and the public key P2 of the user device 508 of the other user are created. At 532, based on the link of the user group and the password of the user group, a connection is established with the key management system 502 and an authentication request is sent to the key management system 502.

At the key management system 502, at 534, the management device 110 merges the following data: the hash value of the certificate of the management device, the hash value of the public key P1 of the user device 504 of group-forming user, and the hash value of the group-forming user's signature on the user group password value and a random number R2 used for verifying the other users. At 536, the hash value of the combined data is signed using the private key KO of the management device 110. At 538, the management device 110 sends the certificate of the management device 110 to the other user device 508, the public key P1 of the user device 504 of the group-forming use, the group-forming user's signature of the user group password and the random number R2, and the signature of the hash value of the combined data.

At the user device 508, at 540, it is determined whether the management device 110 has passed authentication. At 542, it is determined whether the public key P1 of the user device 504 of the group-forming user is verified. At 544, the private key K2 of the user device 508 is used to sign the password of the user group, and the private key K2 of the user device 508 is used to sign the random number R2. At 546, the public key P2 of the user device 508 and the signature data signed with the private key K2 are sent to the key management system 502, the signature data including, for example, the user group password and the random number R2 signed with the private key K2.

At the key management system 502, at 548, the management device 110 verifies the random number R2 signed by the private key K2 of the user device 508 based on the obtained public key P2 of the user device 508, and caches the password of the user group. At 550, the management device 110 numbers all users in the user group.

The following example shows actions in the phase of splitting the transaction key phase.

At the key management system 502, at 552, the management device 110, randomly determines a splitting user for splitting the transaction key in the user group in response to receiving the request to split the transaction key. The splitting user used to split the transaction key and the group-forming user who created the user group can be the same user or different users. In the following example, they are the same user, which is the user device 504. At 554, the management device 110 calculates a hash value of the following combined data for each other user in the user group: the hash value of the certificate of the management device 110, the hash value of other users' numbers in the user group, the hash value of other users' public keys, and the hash value of other users' signatures on user group passwords. At 556, the hardware security module 160 acquires a message about other users from the management device 110, the message about the other users indicating at least the public keys of other users in the user group except for the splitting user. In some embodiments, the message about other users also indicates at least one of the following: the certificate of the management device 110, the public key of the other user, other users' signatures on user group passwords, the signature of the has value of the combined data, and a validity period of the message about other users. At 560, the hardware security module 160 confirms whether the public key of the other user has passed verification based on the signature information of the public key of the other user in response to determining that the certificate of the management device 110 has passed verification. At 562, the hardware security module 160 randomly generates, in response to the public keys of other users passing verification, random numbers $A_0$ to $A_{M-1}$ that are of the same number as the minimum number M of users for recovering the transaction key. $A_0$ represents the transaction key of the transaction. At 564, the hardware security module 160 constructs a polynomial for splitting the transaction key based on the minimum number M of users for recovering the transaction key and the above-mentioned randomly generated random numbers $A_0$ to $A_{M-1}$. At 566, the hardware security module 160 splits the transaction key $A_0$ into N sub-keys $(X_1, Y_1), (X_2, X_2) \ldots (X_N, Y_N)$, which are of the same number as the number of users in the user group, where each sub-key corresponds to one user in the user group. At 568, the hardware security module 160 encrypts each sub-key based on the public key and validity period of the user corresponding to the sub-key. At the key management system 502, at 572, the management device 110 caches multiple encrypted sub-keys $(X_1, Y_1), (X_2, X_2) \ldots (X_N, Y_N)$. In some embodiments, at 574, the management device 110 notifies the user device 508 of other users, for example, the user device 508 may be notified to insert a corresponding hardware security device (such as a USB KEY) 130 to receive the corresponding sub-key. At 576, the management device 110 sends at least one of the following to the user device 508 of other users in response to receiving from another user device 508 a request for distributing a sub-key: the certificate of the management device 110, the number of other users, the public key of the splitting user, the sub-key corresponding to the user device 508, the validity period, and the hash value signature of the above combined data. In the above scheme, the encrypted sub-key is cached in the management device 110 of the key management system 502 and a corresponding sub-key is sent in response to a request of the other user in the user group for distributing the sub-key, therefore, asynchronous separation of transaction keys and distribution can be achieved. The synchronization or real-time operation of other users in the user group is not required, thereby improving the convenience of the authority management system. At the user device 508 of other users, at 578, the certificate and public key of the management device 110 are verified, and the decrypted corresponding sub-key is stored.

The following example shows actions in the phase of recovering the transaction key phase.

At the key management system 502, at 580, the management device 110 designates or randomly determines a recovery user in the user group. At 582, the management device 110 sends transaction information to the users in the user group to confirm whether to agree on the transaction in response to receiving the request about the transaction, where the transaction information indicates at least the transaction content of the transaction and the identifier of the recovery user. At 584, the sub-keys of each verified user in the user group who agreed on the transaction is acquired, where the sub-keys of the verified users are signed with a public key of the recovery user. At the hardware security module 160, a recovery message for recovering the transaction key is acquired from the management device 110. The recovery message includes at least one of the following: the number of verified users and the identifier of the recovery user, the certificate of the management device 110, the transaction data, the association random number associated with this transaction, the sub-keys of other users signed with a public key of the recovery user and the association random number, and the hash value used to verify the recovery message. At 588, in response to determining that the number of verified users is greater than or equal to a first predetermined value, the hardware security module 160 recovers the transaction key based on the sub-keys of the verified users, and the sub-keys of the verified users were generated by splitting the transaction key in advance (such as splitting in the phase of splitting the transaction key). At 590, the hardware security module 160 signs a transaction request regarding the transaction based on the determined transaction key for execution of the transaction. By adopting the above method 500, not only the security of the transaction key can be significantly improved, but also the transaction key can be recovered through the collaboration of M users when some users have problems, thereby improving the reliability of the authority management system.

In addition, because the transaction key is split and recovered remotely (at the hardware security module 160), the security issues that may be caused when the key is split and recovered locally are avoided.

In the data flow direction of FIG. 5 above, the hardware security module 160 is responsible for generating, splitting, and recovering the transaction key, and the management device 110 is responsible for user initialization, user group and user determining, sub-key caching, and verification. However, as mentioned above, the hardware security module 160 can assume part or all of the functions of the management device 110. Without distinguishing the functions of the two, the combination of the two is called a key management system 502.

Figure 6:
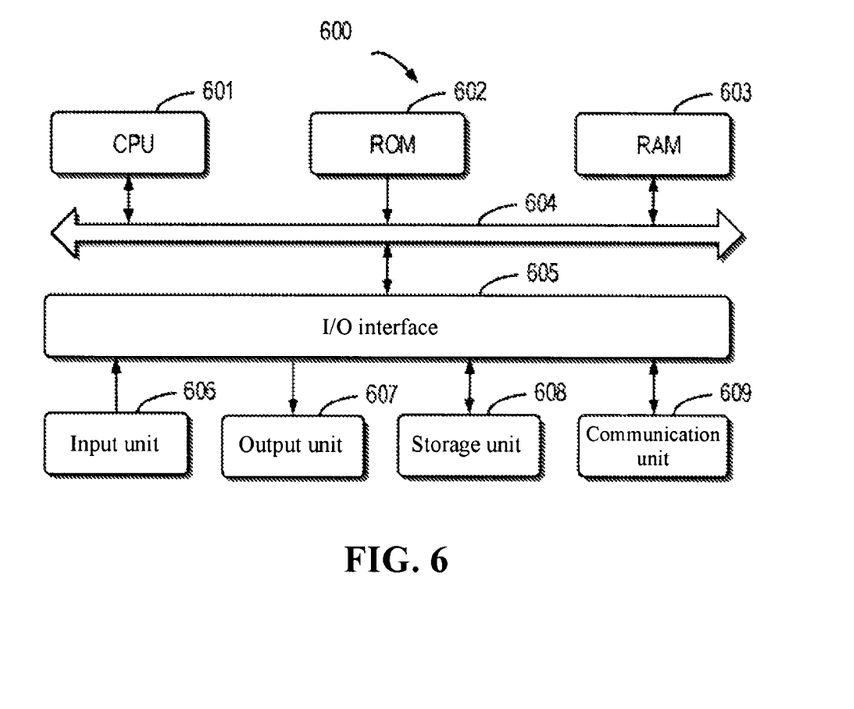
FIG. 6 is a block diagram of exemplarily showing an electronic device 600 for implementing an embodiment of this disclosure.

FIG. 6 is a block diagram of exemplarily showing an electronic device 600 for implementing an embodiment of this disclosure. The device 600 may be used to implement one or more hosts in the user device and the management device in FIGS. 1 and 5. As shown in the figure, the device 600 includes a central processing unit (CPU) 601, which executes various proper actions and processing according to computer program instructions stored in a read-only memory (ROM) 602 or computer program instructions loaded from a storage unit 608 into a random access memory (RAM) 603. In the RAM 603, various programs and data needed for the operation of the device 600 can also be stored. The CPU 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard or a mouse; an output unit 607, such as various types of displays or speakers; a storage unit 608, such as magnetic disks or optical disks; and a communication unit 609, such as a network card, a modem, or a wireless communication transceiver. The communication unit 609 allows the device 600 to exchange information/data with other devices through a computer network such as the Internet and/or various telecommunication networks.

The processing unit 601 executes various methods and processes described above, for example, executing the methods 200, 300, 400, and 500 for managing keys. For example, in some embodiments, methods 200, 300, 400, and 500 may be implemented as computer software programs that are stored on a machine-readable medium, such as storage unit 608. In some embodiments, part or all of the computer programs may be loaded and/or installed on the device 600 via the ROM 602 and/or the communication unit 609. When a computer program is loaded into the RAM 603 and executed by the CPU 601, one or more operations of the methods 200, 300, 500 described above may be executed. Alternatively, in other embodiments, the CPU 601 may be configured to perform one or more actions of the methods 200, 300, 400, and 500 by any other suitable means (for example, by means of firmware).

However, those skilled in the art can understand that in the case where the user device according to this disclosure is a hardware security device 130 integrated with communication and processing function modules, the user device may not include one or more components as described above in combination with FIG. 6.

Similarly, the hardware security module 160 described in combination with FIGS. 1 to 5 may also have a part of the structure of the electronic device 600 as shown in FIG. 6. For example, in the simplest case, the hardware security module 160 may include a processor 601 and memories 602 and/or 603 as shown in FIG. 6.

This disclosure may be a method, an apparatus, a system, and/or a computer program product. The computer program product may include a computer-readable storage medium having computer-readable program instructions for executing aspects of this disclosure.

The computer-readable storage medium may be a tangible device that can keep and store instructions used by the instruction execution device. The computer-readable storage medium may be, for example, but not limited to, an electric storage device, a magnetic storage device, an optical storage device, an electromagnetic storage device, a semiconductor storage device, or any suitable combination of the foregoing. More specific examples (non-exhaustive list) of computer-readable storage media include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, such as a punch card or a raised structure in the groove where instructions are stored, and a proper combination of any of the above. The computer-readable storage medium used herein is not to be interpreted as a transient signal itself, such as a radio wave or other freely propagating electromagnetic waves, electromagnetic waves (for example, light pulses through fiber-optic cables) transmitted through waveguides or other transmission media, or telecommunications signals transmitted through electrical wires.

The computer-readable program instructions described herein can be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of this disclosure may be assembly instructions, instruction set architecture (ISA) instructions, machine instructions, machine-related instructions, microcode, firmware instructions, state setting data, or source code or object code written in any combination of one or more programming languages including object-oriented programming languages such as Smalltalk, C++, etc., and conventional procedural programming languages such as "C" language or a similar programming language. Computer-readable program instructions may be executed entirely on a user's computer, partly on a user's computer, executed as a stand-alone software package, partly on a user's computer and partly on a remote computer, or executed entirely on a remote computer or server. In the case of a remote computer, the remote computer can be connected to the user's computer through any kind of network, including a local area network (LAN) or a wide area network (WAN), or it can be connected to an external computer (such as the Internet connection using an Internet service provider). In some embodiments, the electronic circuit is personalized by using the state information of the computer-readable program instructions, such as a programmable logic circuit, a field programmable gate array (FPGA), or a programmable logic array (PLA). The electronic circuit can execute computer-readable program instructions to implement various aspects of this disclosure.

Various aspects of this disclosure are described herein with reference to flowcharts and/or block diagrams of methods, devices (systems) and computer program products according to embodiments of this disclosure. It should be understood that each block of the flowchart and/or block diagrams, and combinations of blocks in the flowchart and/or block diagrams can be implemented by computer-readable program instructions.

These computer-readable program instructions can be provided to a processing unit of a general purpose computer, a special purpose computer, or other programmable data processing devices, thereby producing a machine, so as to enable these instructions, when executed by a processing unit of a computer or other programmable data processing devices, to generate a device that implements the functions/actions specified in one or more blocks in the flowchart and/or block diagram. These computer-readable program instructions may also be stored in a computer-readable storage medium, which causes a computer, a programmable data processing apparatus, and/or other devices to work in a specific manner. Therefore, a computer-readable medium storing instruction includes a manufacturing article that includes instructions for implementing various aspects of the functions/actions specified in one or more blocks in the flowcharts and/or block diagrams.

Computer-readable program instructions can also be loaded onto a computer, other programmable data processing devices, or other devices, so that a series of operation steps can be performed on the computer, other programmable data processing devices, or other devices to produce a computer-implementing process. As a result, instructions executed on the computer, other programmable data processing devices, or other devices can implement the functions/actions specified in one or more blocks in the flowcharts and/or block diagrams.

The flowchart and block diagrams in the figures illustrate the architecture, function, and operation of possible implementations of systems, methods and computer program products according to various embodiments of this disclosure. In this regard, each block in the flowchart or block diagram may represent a module, a program segment, or a part of an instruction. The part of the module, the program segment or the instruction contains one or more executable instructions for implementing a prescribed logical function. In some alternative implementations, the functions marked in the blocks may also occur in a different order than those marked in the drawings. For example, two consecutive blocks may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs the specified function or action, or it can be implemented with a combination of dedicated hardware and computer instructions.

The embodiments of this disclosure have been described above, the above description is exemplary, not exhaustive, and is not limited to the disclosed embodiments. Many modifications and variations will be apparent to those of ordinary skill in the art without departing from the scope and spirit of the embodiments described. The terminology used herein is chosen to best explain the principles of the embodiments, practical applications or technical improvements in the market, or to enable others of ordinary skill in the art to understand the embodiments disclosed herein.

The above description is only an optional embodiment of this disclosure and is not intended to limit this disclosure. For those skilled in the art, this disclosure may have various modifications and changes. Any modification, equivalent replacement, and improvement made within the spirit and principle of this disclosure shall be included in the protection scope of this disclosure.

The invention claimed is:

1. A method for splitting a transaction key in a key management system, wherein the key management system comprises a management device for managing user devices of users in a user group and a hardware security module connected to the management device, and the method comprises: at the hardware security module,
   acquiring a number of the users of the user group and a first predetermined value, wherein the first predetermined value indicates a minimum number of users for recovering the transaction key, and the user group is configured to manage the transaction key;
   randomly generating the transaction key associated with processing authority of this transaction based on messages about other users except for a splitting user determined for splitting the transaction key in the user group, wherein the messages about other users at least indicate public keys of the other users;
   splitting the transaction key into a plurality of sub-keys of the same number as the number of the users, wherein each sub-key in the plurality of sub-keys corresponds to one user in the user group; and
   encrypting the plurality of sub-keys respectively with public keys of the users corresponding to the plurality of sub-keys.

2. The method according to claim 1, further comprising: at the management device, designating or randomly determining the splitting user in the user group.

3. The method according to claim 1, wherein the messages about other users also indicate at least one of the following:
   signature information for verifying public keys of the other users;
   identifiers of the other users;
   signature information of a hash value of combined data of the other users; and
   a validity period of the messages about other users.

4. The method according to claim 3, wherein randomly generating the transaction key associated with processing authority of this transaction comprises:
   determining, based on the signature information of the public keys of the other users, whether the public keys of the other users pass verification; and
   randomly generating, in response to the public keys of the other users passing verification, a plurality of random numbers that are of the same number as the first predetermined value and configured to construct a splitting polynomial, wherein the plurality of random numbers configured to construct a splitting polynomial comprise the transaction key.

5. The method according to claim 4, wherein the messages about other users also indicate a certificate of the management device, and determining, based on the signature information of the public keys of the other users, whether the public keys of the other users pass verification further comprises:
   determining whether the certificate of the management device passes verification, and
   determining, based on the signature information of the public keys of the other users, whether the public keys of the other users pass verification in response to determining that the certificate of the management device passes verification.

6. The method according to claim 4, wherein splitting the transaction key into a plurality of sub-keys of the same number as the number of the users comprises:
   determining the plurality of sub-keys based on the number of the users of the user group and the plurality of random numbers configured to construct a splitting polynomial, wherein each sub-key comprises a first sub-key component and a second sub-key component.

7. The method according to claim 1, wherein encrypting the plurality of sub-keys respectively with public keys of the users corresponding to the plurality of sub-keys comprises:
encrypting the sub-keys based on the public keys of the users corresponding to the sub-keys and a validity periods of the messages about other users.

8. The method according to claim 1, further comprises: at the management device, signing a random number with a private key of the management device to generate signature data, and sending the generated signature data to a group-forming user determined for forming the user group; and
receiving, from the group-forming user, business information about the user group, public keys of the user devices, and the signature data signed with a private key of a user device of the group-forming user, wherein the business information at least comprises the number of the users of the user group and the first predetermined value.

9. The method according to claim 1, wherein the user devices of the users each further comprise a biometric module configured to determine, based on pre-stored biological characteristics of an authorized user, whether an operator operating the user device is the authorized user of the user device.

10. A computer program product, tangibly stored on a non-transitory computer-readable storage medium and comprising machine-executable instructions, wherein the machine-executable instructions are configured to, when executed, cause a machine to execute the method according to claim 1.

11. A computer-readable storage medium storing machine-executable instructions, wherein the machine-executable instructions are configured to, when executed, cause a machine to execute the method according to claim 1.

12. A key management system, comprising a processor, a memory, and computer programs stored in the memory, wherein the computer programs are configured to, when executed by the processor, cause the key management system to execute the method according to claim 1.

13. A method for recovering a transaction key in a key management system, wherein the key management system comprises a management device for managing user devices of users in a user group and a hardware security module connected to the management device, and the method comprises: at the hardware security module,
acquiring a recovery message for recovering the transaction key, wherein the recovery message comprises a number of verified users who agreed on this transaction in the user group and an identifier of a user that is determined to be a recovery user for recovering the transaction key in the user group, wherein the user group is configured to manage the transaction key;
recovering the transaction key based on sub-keys of the verified users in response to determining that the number of the verified users is greater than or equal to a first predetermined value, wherein the sub-keys of the verified users were generated by splitting the transaction key in advance; and
signing a transaction request regarding this transaction based on the recovered transaction key.

14. The method according to claim 13, further comprising: at the management device, designating or randomly determining the recovery user in the user group.

15. The method according to claim 13, wherein the sub-keys of the verified users are encrypted with a public key of the recovery user.

16. The method according to claim 15, wherein the sub-keys of the verified users and an association random number associated with the transaction are encrypted together with the public key of the recovery user.

17. The method according to claim 13, wherein the recovery message also indicates at least one of the following:
an association random number associated with this transaction;
the sub-keys of the verified users and the association random number that are encrypted with a public key of the recovery user;
signature information of the verified users;
a certificate of the management device; and
signature information of a hash value of the recovery message.

18. The method according to claim 13, further comprising: at the management device,
sending, in response to receiving a request for the transaction, transaction information for determining whether to agree on this transaction to the users of the user group, wherein the transaction information at least indicates transaction content of this transaction and an identifier of the recovery user;
acquiring a sub-key of each verified user who agrees on this transaction in the user group, wherein the sub-keys of the verified users are encrypted with a public key of the recovery user; and
sending, in response to determining that conditions of the transaction is met, the recovery message to the hardware security module.

19. The method according to claim 13, wherein the user devices of the users each further comprise a biometric module configured to determine, based on pre-stored biological characteristics of an authorized user, whether an operator operating the user device is the authorized user of the user device.

20. A key management system, comprising a processor, a memory, and computer programs stored in the memory, wherein the computer programs are configured to, when executed by the processor, cause the key management system to execute the method according to claim 13.

* * * * *